Jan. 9, 1968  H. F. IRVING  3,362,044
MIXING AND SEVERING APPARATUS
Filed June 7, 1965  2 Sheets-Sheet 1

INVENTOR.
HENRY F. IRVING
BY
Learman, Learman & McCulloch
ATTORNEY

Jan. 9, 1968   H. F. IRVING   3,362,044
MIXING AND SEVERING APPARATUS
Filed June 7, 1965   2 Sheets-Sheet 2

INVENTOR.
HENRY F. IRVING
BY
*Learman, Learman & McCulloch*
ATTORNEY

United States Patent Office 3,362,044
Patented Jan. 9, 1968

3,362,044
MIXING AND SEVERING APPARATUS
Henry F. Irving, Saginaw, Mich., assignor to Baker Perkins Inc., Saginaw, Mich., a corporation of New York
Filed June 7, 1965, Ser. No. 461,840
11 Claims. (Cl. 18—12)

This invention relates to a mixer having apparatus for severing lengths of material extruded from the mixing or kneading chamber and more particularly a machine of the type disclosed in United States Patent No. 3,023,455 in which a kneading screw both rotates and reciprocates.

It is common practice in the plastics industry to mix various plasticizers, pigments, and other plastic ingredients and to pelletize the mixed substance. The mixing is performed under regulated temperatures and pressures adapted to provide the best possible blending of the ingredients, and normally the pellets are cooled and stored for subsequent use. While apparatus for pelletizing the output of machines of this character are known, to my knowledge no one has provided apparatus suited to separating the material into strands or ribbons and cutting the strands of blended material as they leave the machine into short lengths suitable for immediate delivery to calendering rolls which then form the hot plastic into sheet or film stock. Many factors, including the temperature of the product being extruded, the temperature of the rolls, and the plasticity of the material, determine whether the calendering operation will be successful.

The invention is generally concerned with a mixer having a fluted plug member mounted on the kneader shaft and movable therewith relative to cut-off means. In a preferred form of the invention the cut-off means is axially adjustable to govern the extent of the flutes or grooves exposed at the end of the rearward stroke of the kneader shaft. I have determined that the axial position of the severing means will permit control of the operation in the sense that the position of the severing means governs the retention time of the material in the mixer and directly affects the output temperature of the material which is passed substantially directly to the calendering rolls and as a consequence affects the ultimate gauge or thickness of the calendered material.

One of the prime objects of the invention is to provide a mixer having a fluted plug and severing ring assembly which is designed to permit the kneading shaft to accomplish the severing operation.

A further object of the invention is to design a mixer having severing means which is axially adjustable during the mixing and kneading operation to provide the requisite control of both the mixing or blending operation and any immediately subsequent operations.

A further object of the invention is to provide a mixer for compounding or blending materials and forming them into strands which may be cut into soft plastic chunks for immediate delivery to calendering rolls which form them into a continuous sheet or film of precise gauge, or which may be solidified and ground into granules and used in subsequent molding operations.

A further object of the invention is to provide a mixer having a novel plug and cut-off member assembly which in a principal form of the invention permits the control of the back pressure in the mixing chamber while the machine is in operation.

Other objects and advantages of the invention will be pointed out specifically or will become apparent from the following description when it is considered in conjunction with the appended claims and the accompanying drawings, in which:

Figure 6:
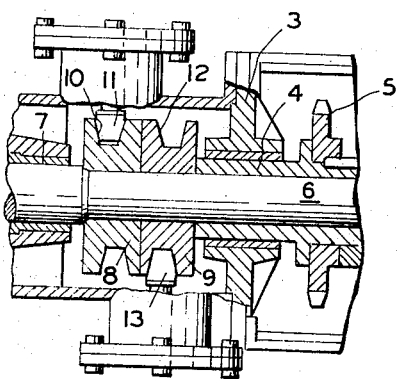
FIGURE 6 is a sectional view of apparatus for rotating and reciprocating the mixing and extruding shaft of either of the disclosed embodiments.

Apparatus constructed in accordance with the invention is adapted for use in mixing machines of known construction, such as the machine disclosed in the aforementioned United States Patent No. 3,023,455, issued Mar. 6, 1962, and to which reference may be had for a more detailed disclosure of the mixing characteristics of the present apparatus. Briefly, however, the mixing apparatus comprises a base 1 on which is mounted a housing 2. Within the housing is a plurality of bearings 3, one of which is shown in FIGURE 6, and in which is journaled a driving sleeve 4 on which is keyed a sprocket wheel 5 or the like that may be rotated by suitable means such as a motor (not shown). Fixed to the driving sleeve 4 and rotated thereby is a shaft 6 that is journaled in bearing 7 supported by the housing 2.

Means is provided to reciprocate the shaft 6 in response to its location and comprises a pair of cams 8 and 9 fixed on the shaft 6 in back-to-back relation. The cam 8 is provided with a peripheral cam groove 10 in which is accommodated a fixed follower 11 that is supported on the housing 2. The cam 9 has a similar cam groove 12 therein in which is accommodated a similar follower 13. The arrangement is such that, upon rotation of the shaft 6, the engagement of the cam followers 11 and 13 in their respective cam grooves effects axial reciprocation of the shaft.

The shaft 6 projects a substantial distance beyond the housing 2 and is received within a tubular barrel 15 that is supported on the housing 2. The interior of the barrel 15 constitutes a blending chamber 17 into the rear end of which substances which may be mixed to form polyvinylchloride plastic, for example, may be introduced to a hopper 18 that communicates with the chamber 17. On the inner periphery of the barrel 15 is a plurality of axially spaced kneading teeth 19 which cooperate with a mixing and material advancing blade 20 secured to the shaft 6 for mixing materials in the chamber 17 and feeding them toward the forward end thereof. The blade 20 is interrupted at intervals along its length, as is indicated at 21, so as to permit reciprocation of the shaft 6 without interference between the teeth 19 and the blade 20. The barrel 15 is surrounded by a jacket 22 having compartments 23 therein through which a heat exchange medium may be circulated.

The forward end of the barrel 15 terminates in an enlarged flange 24 to which is bolted or otherwise suitably secured a tubular extension 25 having a bore 26 in prolongation of the chamber 17 and which is open at its forward end. The shaft 6 extends into the bore 26 and has fixed thereto a sleeve 27 to the outer surface of which is fixed a helical extruding blade 28 which terminates short of the forward end of the sleeve 27. The blade 28 fits closely adjacent the surface of the bore 26, but has sufficient clearance to permit rotation and axial movements relative to the sleeve 25. Provided pust rearwardly of the screw blade 28 is an enlarged shoulder plug 28a which helps control the mixing operation in the chamber 17 in the manner mentioned in the patent to which I have referred. The member 25 is provided with an internal compartment 29 through which a heat exchange fluid may be circulated and also is provided with a radial vent 30 through which gases may escape.

Fixed to the forward end of the shaft 6 for rotation and reciprocation with the latter is an extrusion head or plug member generally designated 33 which has a skirt portion 3 4at its inner or rearward end that receives the shaft 6. The plug is axially bored to accommodate a bolt 35 that may be threaded into an opening formed in the shaft 6 so as to secure the plug 33 to the shaft 6. The inner end of the skirt 34 is radially reduced as at 36 to cooperate with the complementally shaped end of the sleeve 27 to provide a smooth joint between the members 27 and 33.

The forward portio nof the plug member 33 is enlarged relatively to the skirt portion 34, and the enlarged portion is provided with helical peripheral passage or groove 37 circumferentially spaced about the plug and extending from the rear or inner end of the enlargement toward but terminating short of the forward end thereof. Thus, the forward end of the plug or head 33 has a smooth, unbroken peripheral edge 38.

Figure 1:
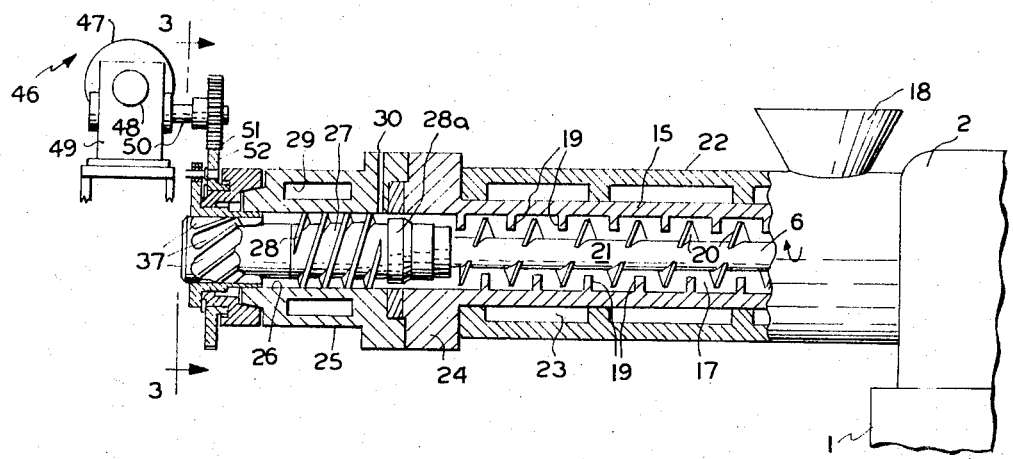
FIGURE 1 is a fragmentary, partly sectional and partly elevational view of apparatus constructed in accordance with one embodiment of the invention.
Figure 2:
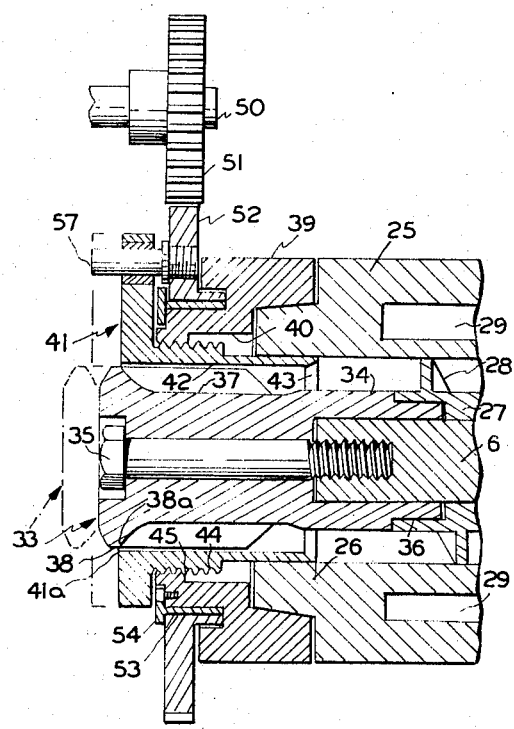
FIGURE 2 is an enlarged, sectional view of a portion of the apparatus shown in FIGURE 1.

As is indicated in FIGURES 1 and 2, the plug member 33 projects a substantial distance forwardly of the sleeve 25. To the sleeve, however, is bolted or otherwise suitably fixed an extension collar 39 having a bore 40 of substantially greater diameter than the bore 26 of the sleeve 25.

Tubular severing or cutting means 41, having an annular cut-off edge 41a, is mounted at the forward end of the mixing and extruding apparatus and comprises an annular sleeve or ring 42 interposed between the collar 39 and the plug 33 so as t completely overlie the grooves 37 when the shaft 6 is in its rearward position as shown in solid lines in FIGURES 1 and 2. The ring 42 extends into the bore 26 of the extension sleeve 25 so as to reduce the discharge end of the mixing and blending chamber, and the rear end of the ring 42 is chamfered as at 43 to facilitate entry of the mixed material into the ring. The inside diameter of the sleeve 42 corresponds to the diameter of the end 38 of the plug 33, with just sufficient clearance to enable the sleeve to pass over the plug.

The severing means 41 is mounted on the mixing apparatus for adjustment axially of the shaft 6. The mounting means comprises a threaded enlargement 44 on the sleeve 42 and a correspondingly threaded, radially inwardly projecting flange 45 formed on the member 39. The arrangement is such that rotation of the member 41 in one direction causes the sleeve 42 to move rearwardly relative to the collar 39 and mixer barrel, whereas rotation of the member 41 in the opposite direction causes the sleeve to move forwardly relative to the collar 39 and mixer barrel.

In the preferred construction, power means 46 is provided for effecting axial adjustment of the severing means 41 and comprises an electric motor 47 connected to the input shaft 48 of a reduction gear unit 49, the driven output shaft 50 of which is keyed to a pinion 51 in mesh with a gear 52 that is rotatably mounted on the collar 39 by means of a bearing 53. A retaining ring 54 secured to the member 39 prevents axial movement of the gear 52 relative to the member 39, but permits free relative rotation thereof.

Figure 3:
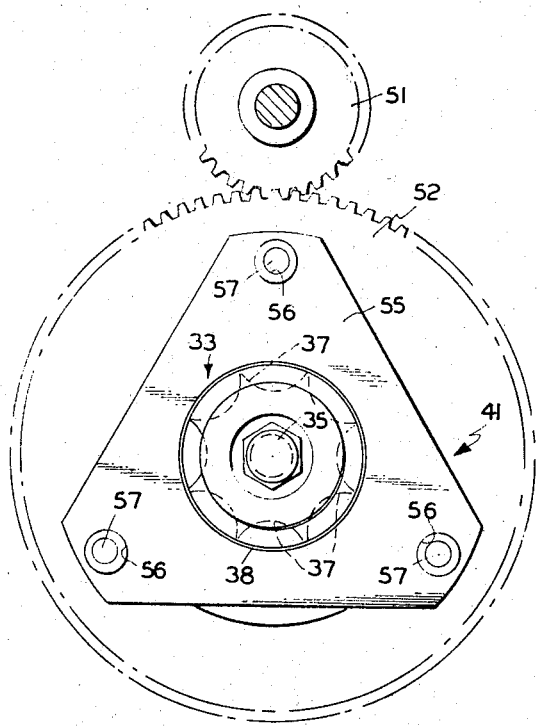
FIGURE 3 is a sectional view taken on the line 3—3 of FIGURE 1.

As is best shown in FIGURE 3, the severing means 41 includes a generally triangular plate 55 having three openings 56 therein. Journaled in each of the openings 56 is a drive transmitting pin 57 which is secured to and projects forwardly from the gear 52. The construction and arrangement of the power means 46 are such that rotation of the pinion 51 in one direction causes rotation of the ring means 41 via the pins 57 in such direction as to cause the sleeve to move forwardly relative to the rear position shaft 6, and rotation of the pinion in the opposite direction causes the sleeve 42 to move rearwardly relative to the rear position of the shaft.

In the operation of the apparatus thus far described, the materials to be mixed are introduced to the chamber 17 via the inlet 18, and the main driving motor (not shown) started to rotate the shaft 6 via the sprocket 5. As the shaft 6 rotates it also reciprocates, as is explained in the aforementioned patent, so as to mix or knead the materials in the mixing chamber and feed them forwardly toward the front end of the mixing chamber. Any material that is discharged from the mixing chamber must pass between the plug 33 and the sleeve 42 via the flutes or grooves 37 which form passages between the plug and the sleeve. The amount of material which may be discharged from the mixing chamber will depend upon the relative positions of the plug and 38 and the ring member 41. The relative positions of these members are controlled in part by the reciprocation of the shaft 6 and by the position of the ring member 41. The construction is such that, when the ring member 41 is adjusted to its most rearward position, as is shown in full lines in FIGURE 2, and when the shaft 6 is in its most rearward position, as also is shown in full lines in FIGURE 2, the forward end of the sleeve 42 completely overlies and closes the grooves 37 so as to prevent the discharge of any material through the grooves. When the shaft 6 is moved axially forwardly to the phantom line position shown in FIGURE 2, however, the forward ends of the grooves 37 will be open, thereby permitting a plurality of strands or ribbons of material to pass between the ring member 41 and the plug end 38. Upon rearward axial movement of the shaft 6 from the chain line position shown in FIGURE 2, the outer edge 41a of the member 41 will cooperate with the edge 38a of the plug 33 to sever the material being extruded so as to form lengths suitable for immediate transport to conventional calendering rolls while in a hot state.

When the ring means 41 is in its most rearward position, the discharge of material is at its maximum. The discharge of material may be reduced by operation of the power means 46 in such manner as to cause the ring means 41 to move forwardly as is indicated by the phantom lines in FIGURE 2. The sleeve 42 may be moved forwardly such a distance as to prevent the discharge of any material from the mixing machine, or to permit the discharge of any selected quantity between the extremes of none and the maximum. The pitch of advancing blades 28 is such as to maintain the flutes 37 filled at all times.

The apparatus 46 may be operated when the shaft 6 of the mixing machine is being rotated and reciprocated, thereby enabling the machine operator to adjust the amount of material being extruded to meet the conditions required. Moreover, the ability of the discharge to be regulated during operation of the machine enables the operator to make adjustments to regulate the temperature of material within the mixing chamber and thereby control the output temperature. That is, by restricting the amount of material discharged from the mixer, the retention time of the material in the mixer and consequently the temperature of the materials being mixed and kneaded within the mixing chamber can be increased.

Figure 5:
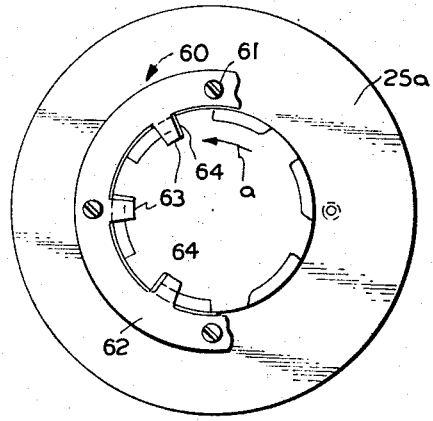
FIGURE 5 is a fragmentary, end elevational view of the apparatus shown in FIGURE 4.
Figure 4:
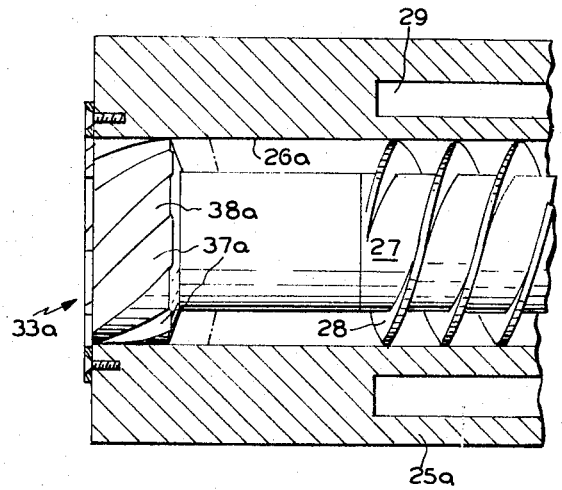
FIGURE 4 is a view similar to FIGURE 2 but illustrating a modified form of the apparatus.

In the embodiment disclosed in FIGURES 4 and 5, only those parts which differ from the previously described embodiment will be referred to in detail.

The apparatus disclosed in FIGURES 4 and 5 comprises an extension sleeve 25a similar to the sleeve 25 except that the sleeve 25a terminates at its forward end in a flat face. A plug or head member generally designated 33a is mounted on the forward end of the shaft 6 in the same manner as is the plug member 33 and includes an enlargement 38a having circumferentially spaced, peripheral grooves 37a which extend the full length of the enlargement and form passages between the latter and the bore 26a of the member 25a through which material from the mixing chamber may be extruded.

On the forward end of the member 25a axially forward of the plug 33a is mounted a ring member 60 by means of screws 61 or the like and comprising an annulus 62 which overlies the grooves 37a. The annulus 62 is provided with a number of radially inwardly projecting knives 63 corresponding to the number of grooves 37a. One radial edge of each knife 63 is sharpened as is indicated at 64.

The plug member 33a reciprocates with the shaft 6 between the full line and phantom line positions shown in FIGURE 4 and rotates in the direction of the arrow "a" shown in FIGURE 5. As the shaft rotates, the materials in the mixing chamber are blended and kneaded and are fed forwardly to the open end of the mixer by the mixing blades and by the blade 28. As the plug 33a rotates and reciprocates, material moves through the passages formed by the grooves 37a so as to be extruded in ribbons or strands. As the plug member 33a rotates, each ribbon of material being extruded is presented in succession to a knife 63 which severs the ribbon at the end of the forward stroke of plug 33a to form the lengths desired. In this instance the blades 28 also keep the grooves 38a filled at all times.

The disclosed embodiments are representative of presently preferred forms of the invention, but are intended to be illustrative rather than definitive thereof. The invention is defined in the claims.

I claim:

1. Mixer apparatus for forming desired lengths of extruded material comprising wall means forming an extrusion chamber through one end of which lengths of material are adapted to be extruded; extruding means; means mounting said extruding means in said chamber for rotation and reciprocation to extrude material through said one end of said chamber, said extruding means having passages between itself and said wall means at said one end of said chamber through which lengths of material may pass from said chamber; cutting means non-rotatably mounted adjacent said one end of said chamber and in overlying relation with said passages; and means for rotating and reciprocating said extruding means.

2. Mixer apparatus for forming pellets from lengths of extruded material comprising wall means forming an extrusion chamber through one end of which lengths of material are adapted to be extruded; extruding means; means mounting said extruding means in said chamber for reciprocation and for rotaton to extrude material through said one end, said extruding means having passages therein between itself and said wall means at said one end of said chamber through which lengths of material may pass from said chamber; means for rotating and reciprocating said extruding means; and non-rotatable cutting means supported externally of said chamber in overlying relation with said passages and operable in response to rotation of said extruding means to cut material emerging from said passages.

3. Mixer apparatus for forming pellets from lengths of extruded material comprising wall means forming an extrusion chamber through one end of which lengths of material are adapted to be extruded; extruding means; means for feeding material to said extruding means; means mounting said extruding means in said chamber for reciprocation to extrude material through said one end, said extruding means having passages therein between itself and said wall means at said one end of said chamber through which lengths of material may pass from said chamber; means for reciprocating said extruding means; and cutting means supported in overlying relation with said passages and operable in response to reciprocation of said extruding means to cut material emerging from said passages.

4. Mixer apparatus for extruding material comprising wall means forming a cylinder having an open end; reciprocable and rotatable extruding means in said cylinder for advancing material toward said one end thereof; plug means is said cylinder at said open end thereof and having peripheral grooves therein forming passages through which lengths of material may pass, said grooves extending from the inner end of said plug means toward but terminating short of the other end thereof; ring means overlying said plug means and in sliding engagement therewith; and means for axially adjusting at least one of said plug means and said ring means for selectively opening or closing said passages to the exterior of said cylinder.

5. Mixer apparatus for extruding material comprising wall means forming a cylinder having an open end; extruding means in said cylinder for advancing material toward said one end thereof; plug means in said cylinder at said open end thereof and having peripheral grooves therein forming passages through which lengths of material may pass, said grooves extending from the inner end of said plug means toward but terminating short of the other end thereof; ring means overlying said plug means and in sliding engagement therewith; and means for reciprocating said plug means axially relatively to said ring means to vary the length of said grooves closed by said ring means.

6. Apparatus for extruding material comprising wall means forming a cylinder having an open end; reciprocable and rotatable extruding means in said cylinder for advancing material toward said one end thereof; plug means in said cylinder at said open end thereof and having peripheral grooves therein forming passages through which lengths of material may pass, said grooves extending from the inner end of said plug means toward but terminating short of the other end thereof; ring means overlying said plug means and in sliding engagement therewith; and means for adjusting said ring means axially of said plug means to vary the length of said grooves closed by said ring means.

7. The apparatus set forth in claim 6 wherein said ring means is threaded and said adjusting means comprises a threaded, rotatable driving member in engagement with said ring means, and means for rotating said driving member.

8. Mixer apparatus for forming desired lengths from extruded ribbons of material comprising: wall means forming an extrusion chamber through an outer end of which lengths of material are adapted to be extruded in an axial direction; extruding means reciprocably and rotatively supported in said chamber for moving material therein toward said end, said extruding means having passages between itself and said wall means at said end of said chamber; means for reciprocating and rotating said extruding means; cutting edge means at said end of said chamber adjacent said passages for engagement with lengths of material extruded through said passages; relative movement of said extruding means and cutting edge means during extrusion of said lengths cutting the latter into lengths.

9. The apparatus set forth in claim 8 in which said cutting edge means comprises an annular edge on said wall means and said extruding means has an end wall, slightly less in diameter than the diameter of said edge, closing the outer end of said passages; the reciprocating stroke of said extruding means being such that said end wall is moved axially outwardly beyond the annular edge and returns to the annular edge to cooperate with the edge in severing the lengths.

10. The apparatus set forth in claim 8 in which said cutting edge means comprises edges on a series of generally radially extending blades mounted on the wall means in the rotary path of said extruding passages; the reciprocating stroke of said extruding means being such that at the end of its outward movement the extruding means has moved adjacent said blades.

11. Mixer apparatus for extruding strands of material from a mixer housing, said apparatus comprising: a mixer housing having an open end; a shaft disposed generally axially therein, having forwarding blades thereon extending toward one end of said shaft, and having an extruding plug fixed at said one end of said shaft; means for reciprocating and rotating said shaft and said extruding plug relative to said housing, said extruding plug having a diameter corresponding substantially to the diameter of said open end of said housing, said extruding plug having generally axially extending passages extending therethrough through which said strands of material may pass; and cutting edge means at said end of said housing adjacent said extruding plug; relative rotary movement between said cutting edge means and extruding plug passages cutting said strands into lengths.

References Cited

UNITED STATES PATENTS

| | | | |
|---|---|---|---|
| 2,607,077 | 8/1952 | Dulmage | 18—12 |
| 2,127,857 | 8/1938 | Bond. | |
| 2,370,952 | 3/1945 | Gordon | 18—12 X |
| 2,734,226 | 2/1956 | Wilbert | 18—12 X |
| 1,868,990 | 7/1932 | Peelle | 18—12 |
| 2,573,440 | 10/1951 | Henning | 18—12 X |
| 2,731,247 | 1/1956 | Hurdry. | |
| 2,752,633 | 7/1956 | Weitzel | 18—12 |
| 2,875,798 | 3/1959 | Kunzi et al. | 18—12 X |
| 2,894,280 | 7/1959 | June. | |
| 2,897,541 | 8/1959 | Orsini. | |
| 3,023,455 | 3/1962 | Geier et al. | |

WILLIAM J. STEPHENSON, *Primary Examiner.*